Figure 1:
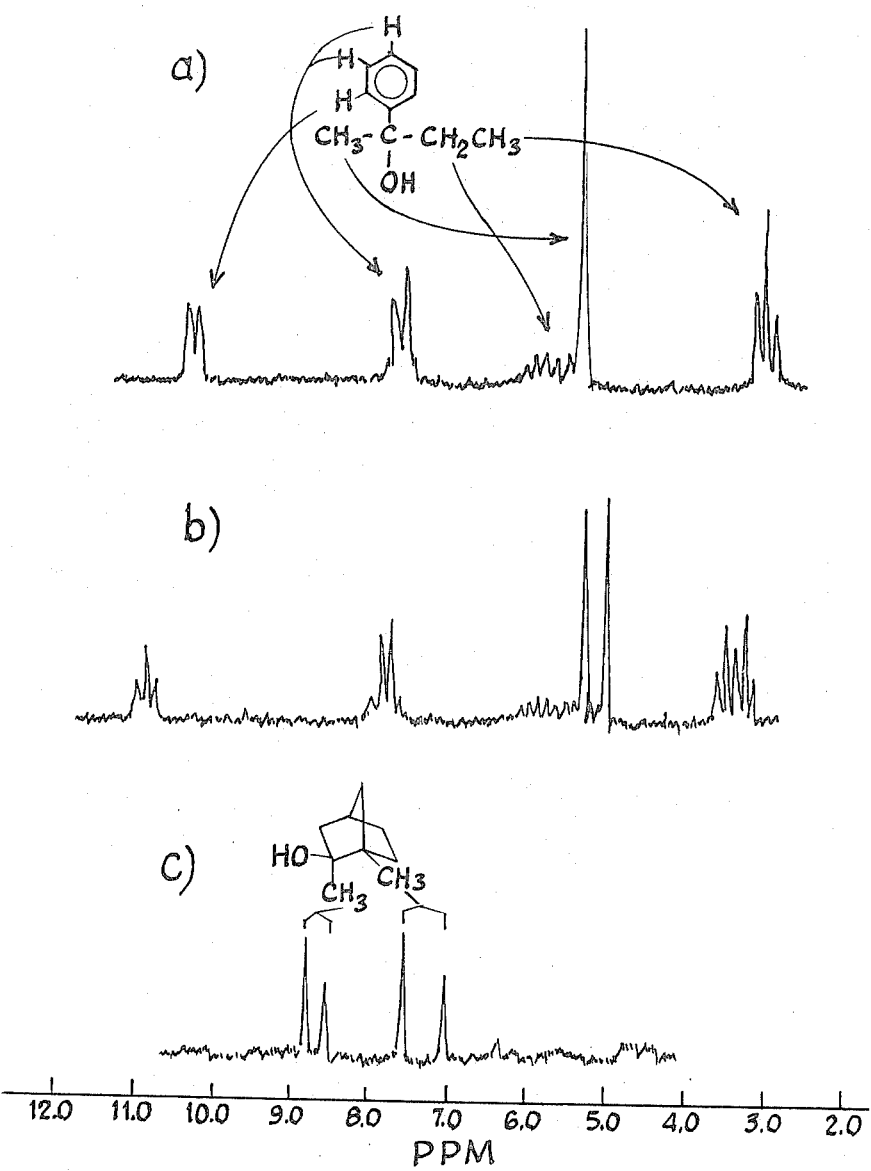

United States Patent [19]
Goering et al.

[11] 3,789,060
[45] Jan. 29, 1974

[54] FLUORINATED CAMPHOR DERIVATIVES AND EUROPIUM AND PRASEODYMIUM CHELATES THEREOF

[75] Inventors: Harlan L. Goering; John N. Eikenberry; Gerald S. Koermer, all of Madison, Wis.

[73] Assignee: Wisconsin Alumni Research Foundation, Madison, Wis.

[22] Filed: Nov. 3, 1971

[21] Appl. No.: 195,429

[52] U.S. Cl............ 260/429.2, 260/586, 23/230 M, 324/0.5
[51] Int. Cl............................................ C01f 17/00
[58] Field of Search................................. 260/429.2

[56] References Cited
UNITED STATES PATENTS

| | | | |
|---|---|---|---|
| 3,453,319 | 7/1969 | Eisentraut et al................ | 260/429.2 |
| 3,539,941 | 11/1970 | Halverson..................... | 260/429.2 X |
| 3,700,410 | 10/1972 | Sievers........................ | 260/429.2 X |

OTHER PUBLICATIONS

Whitesides et al., "Tris[3–(Tertbutylhydroxymethylene)d–Camphorate] Europium III . . ." Journal of Am. Chem. Soc., Vol. 92, No. 23, Nov. 18, 1970 p. 6979 [QD1/A5].

Chen et al., "Co III & V III Complexes of 3–substituted Camphor" Journal of Am. Chem. Soc., Vol. 90 No. 24, Nov. 20, 1968, p. 6660 [QD1/A5].

Schildcrout et al., "Ion. Pot. of Tris(B–Diketonate) Metal III Complexes," Journal of Am. Chem. Soc., Vol. 90, No. 15, July 17, 1968, p. 4006 [QD1/A5.

Briggs et al., "Lanthanide–Induced Shifts in NMR Spectroscopy . . . " Journal of Chem. Soc., Sec. D, No. 12, June 24, 1970 p. 749 [QD1/C6ad].

*Primary Examiner*—Carl D. Quarforth
*Assistant Examiner*—R. L. Tate
*Attorney, Agent, or Firm*—McDougall, Hersh & Scott

[57] ABSTRACT

Optically active fluorinated compounds derived from d- or l-camphor and their corresponding europium and praseodymium chelates and their use as chiral NMR shift reagents.

6 Claims, 2 Drawing Figures

FLUORINATED CAMPHOR DERIVATIVES AND EUROPIUM AND PRASEODYMIUM CHELATES THEREOF

The invention described herein was made in the course of work under a grant or award from the Department of Health, Education and Welfare.

This invention relates to d- and l-camphor derivatives and their corresponding europium and praseodymium chelates and the uses thereof as chiral NMR shift reagents to determine enantiomeric (d and l) compositions (optical purities) of alcohols, esters, ketones and other compounds containing functional groups of oxygen, nitrogen or sulphur.

More specifically, the invention is addressed to optically active compounds derived from d- or l-camphor and having the general formula

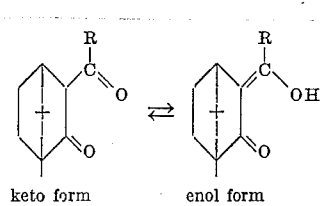

keto form     enol form and to their corresponding chiral chelates with europium and praseodymium, which may be represented by the formula

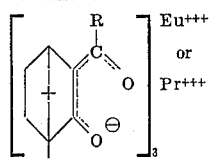

in which R is a short chained halogenated organic group containing from one to eight carbon atoms and preferably one to five carbon atoms, in which at least some, and preferably all, of the hydrogen groups are replaced with a halogen and in which the halogen group is selected of chlorine and preferably fluorine and mixtures thereof.

Most representative of the compounds are 3-trifluoromethyl-hydroxymethylene-d-comphor (1) and 3-heptafluoropropylhydroxy-methylene-d-camphor (2) and their corresponding chelates tris [3-(trifluoromethylhydroxymethylene)-d-camphorato]europium (III) (3) or pradeodymium (III) (4) and tris [3-(heptafluoropropylhydroxymethylene)-d-camphorato]europium (III) (5) or praseodymium (III) (6).

It has been found that for several classes of organic compounds, the active chelates produce NMR shifts which differ for enantiomers such that it becomes possible from the shifted NRM spectra to make direct determinations of enantiomeric compositions of several classes of compounds including alcohols, ketones, esters, epoxides and amines.

Similar methods, based on chemical shift nonequivalence of enantiomers in chiral solvents or in the presence of a chiral shift reagent such as tris [3-tert-butylhydroxymethylene)-d-camphorato]-europium (III)(7) have been reported (G. M. Whitesides and D. W. Lewis, J. Amer. Chem. Soc. 92, 6979 (1970). However, these appear to have limited applicability in that the magnitudes of non-equivalence in chiral solvents are small ( ≪ 0.04 ppm). This limits the usefulness of the technique for determining enantiomeric compositions. Large pseudocontact shift differences for enantiomeric amines are observed with compound (7). However, with neutral compounds, magnitudes of nonequivalence are generally too small to be useful. On the other hand, with compound (3), representing the practice of this invention, pseudocontact shift differences of >0.5 ppm have been observed for enantiomeric alchols. Furthermore, with the europium chelates there is little line broadening of signals for enantiotopic protons.

In FIG. 1, part d1-shows the spectrum of a carbon tetrachloride solution of dl-2-phenyl-2-butanol in the presence of tris (dipivalo-methanato)europium (III), and part (b) shows the spectrum of a carbon tetrachloride solution of the same dl-2-phenyl-2-butanol in the presence of compound (3), representing the practice of this invention. This comparison shows that similar pseudocontact shifts ($\Delta \delta$) are observed with the two reagents. As illustrated by spectrum (b), in the presence of tris[3-(trifluoromethylhydroxymethylene)-d-camphorato]europium-(III) (3), pseudocontact shift differences for enantiomers are observed. The enantiotopic alpha-methyl singlets are separated 0.29 ppm and the beta-methyl triplets are separated 0.22 ppm which correspond to ~2 J and gives rise to a quintuplet.

A more dramatic example of nonequivalence is illustrated by the lower spectrum (c) in FIG. 1, of partially active 1,2-dimethyl-exo-norboranol in which, in the presence of the compound (3), large shift differences are shown for the corresponding methyl groups of the enantiomers. It may be noted that nonequivalence is largest (greater than 0.5 ppm) for the least shifted methyl group which, presumably, is the 1-methyl group.

Typical results that have been secured with compound (3) as a shift reagent with other types of compounds are summarized in Table I. This table shows the pseudocontact shift differences ($\Delta \Delta \delta$) for the indicated enantiotopic protons.

Magnitudes of nonequivalence ($\Delta\Delta\delta$) depend on the ratio of compound (3) to substrate. Conditions have been optimized for dl-2-phenyl-2-butanol. In this case, $\Delta\delta$ and $\Delta\Delta\delta$ (for both methyl groups) increase with the ratio of compound (3) to the dl-2-phenyl-2-butanol, until the molar ratio reaches ~0.7, whereafter there is little change. This indicates that, at ratios greater than 0.7, essentially all of the substrate is coordinated. Nonequivalence was not observed for protons that are enantiotopic by internal comparison, e.g., 2-propanol and dimethyl sulfoxide.

TABLE I.

Pseudocontact Shift Differences for Enantiomers ($\Delta\Delta\delta$) in the presence of compound (3)[a], (tris[3-(trifluoromethylhydroxy-methylene)-d-camphorato]europium (III).

| Compound | Proton | $\Delta\Delta\delta$ ppm |
|---|---|---|
| 2-Octanol | $\alpha$-CH$_3$ | 0.11 |
| 1,2-Dimethyl-endo-2-norbornanol | 1-CH$_3$ | 0.37 |
|  | 2-CH$_3$ | 0.33 |
| 1-Phenylethanol | $\alpha$-H | 0.30 |
| 1-Phenylethyl acetate | —CO$_2$C—CH$_3$ | 0.18 |
| 1-Methyl-2-norbornanone | 1-CH$_3$ | 0.17 |
| 3,3-Dimethyl-2-aminobutane | $\alpha$-CH$_3$ | 0.28 |
| cis-$\beta$-Methylstyrene oxide | $\beta$-CH$_3$ | 0.27 | a. Concentration of (3) ~0.4M (200 mg/0.6 ml CCl$_4$). Molar ratio of 3/ substrate >0.6.

Nonequivalence of enantiomers is also observed with the praseodymium analog of compound (3) and differences are at least as large as with compound (3). In this case, induced shifts are in the upfield direction.

Figure 2:
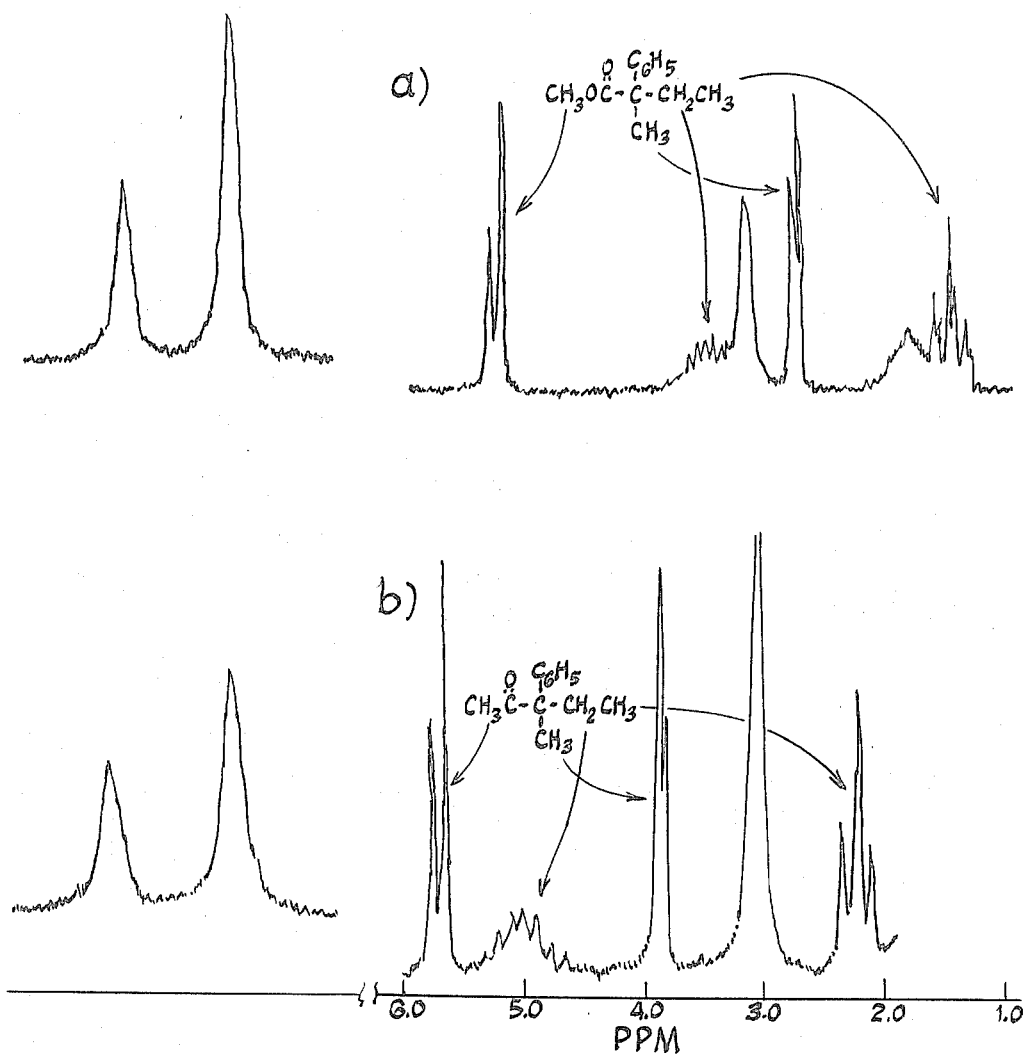

The use of compound (3) for direct determination of enantiomeric compositions is illustrated by FIG. 2 which shows spectra of optically active methyl 2-methyl-2-phenyl-butanoate and 3-methyl-3-phenyl-2-pentanone in the presence of tris [3-(trifluoromethylhydroxymethylene)-d-camphorato]europium (III) (3). Both compounds were prepared from the same sample of partially resolved 2-methyl-2-phenylbutanoic acid (excess S isomer), and thus have the same optical purities. For methyl 2-methyl-2-phenyl-butanoate, nonequivalence is observed for the O-methyl (R 5.30 ppm, S 5.23 ppm) and 2-methyl protons (R 2.82 ppm, S 2.78 ppm). Similarly, for the 3-methyl-3-phenyl-2-pentanone nonequivalence is observed for the acyl-methyl (R 5.78 ppm, S 5.68 ppm) and 3-methyl protons (S 3.90 ppm, R 3.83 ppm). Expanded sweep widths of the downfield methyl resonances are shown to the left of the corresponding spectrum. Peak areas of the expanded signals correspond to optical purities of 27.7 percent for the butanoate and 27.3 percent for the pentanone as compared to 25.8 percent for the butanoate and 25.4 percent for the pentanone determined from rotations. It is noteworthy that in the spectrum of the pentanone the sense of nonequivalence is reversed for the acyl-methyl and 3-methyl singlets. This indicates that nonequivalence results from intrinsicly different magnetic environments for coordinated enantiomers rather than from differences in stability constants for complexes of enantiomers.

Having identified the compounds and their utility as chiral NMR shift reagents for determining enantiomeric compositions, description will now be given for the preparation of representative compounds of this invention.

EXAMPLE 1

Preparation of 3-trifluoromethylhydroxymethylene-d-camphor (1)

19 grams of sodium hydride (59.5 percent in mineral oil, 0.47 mole, Metal Hydrides, Inc.) was added to 300 ml of dimethoxyethane previously distilled from sodium hydride. 30.4 grams (0.20 mole) of d-camphor was added in one portion and the reaction mixture was brought to reflux and stirred for 1 hour. Evolution of gas was observed shortly after reflux began and continued at a sluggish rate. A solution of 31.3 grams (0.22 mole) of ethyl trifluoroacetate in 100 ml of dimethoxyethane was added with stirring to the refluxing reaction mixture over a period of 1.5 hours. Upon addition of the ester, the evolution of gas became more rapid and continued at a moderate rate until nearly all of the ester had been added, at which time the evolution slowed appreciably. Reflux was continued for 2 hours after all of the ester had been added.

The reaction mixture was cooled with ice water and 25 ml of 95 percent ethanol was added to destroy excess sodium hydride. The reaction mixture was poured onto 800 ml of water, acidified with concentrated hydrochloric acid, and extracted with four 200 ml portions of pentane. The combined pentane extracts were washed with two 200 ml portions of 5 percent aqueous sodium bicarbonate solution and then with 200 ml of water. After drying with magnesium sulfate and removal of the pentane in vacuo, 45.6 g of a dark red liquid was obtained.

The product was purified by chromatography on a column of 800 g of silica gel (grade 950, 60–200 mesh, Grace Davison Chemical Company). Attempts to purify the crude product by distillation failed to remove unreacted camphor. Elution with 4.2 l of 5 percent ether in hexane removed the product from the column with no detectable (infrared analysis) traces of camphor. The presence of the product (1) in the eluent is readily detected by the deep red color resulting from a ferric chloride test.

Evaporation of the solvent yielded 28 g of a red liquid which was further purified by vacuum distillation. A total of 25.1 g of colorless liquid having a boiling point of 100°–102° at 16 mm, was collected for a 53 percent yield. A middle fraction was further characterized by IR, UV, NMR, chemical analysis and rotation of polarized light. All fractions had identical IR spectra.

EXAMPLE 2

Prepration of 3-heptafluoropropylhydroxymethylene-d-camphor or 3-perfluorobutyryl-d-camphor (2)

The method used was essentially identical to that used in Example 1 except that n-heptafluorobutyryl chloride was used in place of the corresponding ester. 9.12 g (0.060 mole) of d-camphor was condensed with 15.33 g (0.066 mole) n-heptafluorobutyryl chloride in 100 ml dimethoxyethane with 5.34 g (0.006 mole) sodium hydride. The yield was 4.5 g (21 percent of compound having a boiling point of 42°/0.14 mm Hg. The product was characterized through IR, UV and NMR spectrocopy and by chemical analysis and rotation of polarized light.

EXAMPLE 3

Using the procedure of Example 2 the reactant compound heptaflurobutyryl chloride may be replaced by trichloroacetyl chloride, pentafluoropropionyl chloride, difluorochloroacetyl chloride, heptachlorobutyryl chloride or n-nonafluoropentanoyl chloride to produce the corresponding 3-trichloromethylhydroxymethylene-d-camphor, 3-pentafluoroethylhydroxymethylene-d-camphor, 3-difluoromonochloromethylhydroxymethylene-d-camphor, 3-heptachloropropylhydroxymethylene-d-camphor and 3-nonafluorobutylhydroxymethylene-d-camphor.

The produces of Examples 1, 2 and 3 may be followed with the substituion of l-camphor for d-camphor to produce the corresponding l-camphor derivatives.

EXAMPLE 4

Preparation of tris[3-trifluoromethylhydroxymethylene)-d-camphorato]europium (III) (3)

8 ml of 1 M sodium hydride in 50 percent aqueous methanol was added to a stirred solution of 2.00 g (8 millimole) of the diketone of Example 1 in about 5 ml of absolute ethanol. While introducing 0.9 g of europium (III) chloride hexahydrate (2.7 millimoles), dissolved in a minimum amount of methanol, the solution became yellow and a precipitate formed. The reaction mixture was stirred for 2 hours after the addition of europium chloride. When water was added dropwise, more precipitate formed and finally, a gummy yellow substance was obtained. This was taken up in pentane and the reaction solution was extracted three times with pentane. The pentane extracts were combined, washed with water, dried over MgSO₄ and Na₂SO₄ and filtered twice. The solvent was removed on a rotary evaporator under reduced pressure. The resulting yellow solid was dissolved in carbon tetrachloride, filtered and the solvent was removed leaving a yellow amorphous solid. Dehydration under vacuum (<0.1 mm) overnight gave 2.43 g (theoretical yield 2.42 g) of chelate (3) $[\alpha]_{589}^{20}=+138.56°$, $[\alpha]_{546}^{20}=+176.44°$. Purification by distillation raised the specific rotations but did not change the NMR properties of the chelate. The infrared spectrum was free of diketone absorptions. The NMR spectrum (CCl₄) of chelate (3) showed broad resonances occuring from 3 to −1 ppm from tetramethylsilane.

EXAMPLE 5

Preparation of tris[3-trifluoromethylhydroxymethylene)-d-camphorato]praseodymium (III) (4)

The procedure used is essentially the same as that employed to prepare the corresponding europium derivative in Example 5. 3-trifluoromethylhydroxymethylene-d-camphor, in the amount of 1.49 g (6.0 millimoles) was reacted with 0.50 g (2.0 millimoles) of praseodymium (III) chloride in the presence of 6.2 ml of 0.97 M NaOH in 50 percent ethanol to give 1.36 g of product, corresponding to a yield of 77 percent.

EXAMPLE 6

Preparation of tris[3-heptafluoropropylhydroxymethylene)-d-camphorato]europium (III) (5)

The procedure was the same as that described for the preparation of the europium chelate in Example 5, but with the following materials: 3.14 g (9.0 millimoles) of 3-heptafluoropropylhydroxymethylene-d-camphor of Example 2 was reacted with 1.10 g (3.0 millimoles) of europium (III) chloride hexahydrate in the presence of 9.3 ml of 0.97 mole of NaOH in 50 percent aqueous ethanol to yield 2.30 g of product, corresponding to a yield of 64 percent.

EXAMPLE 7

Preparation of tris[3-heptafluoropropylhydroxymethylene)-d-camphorato]praseodymium (III) (6)

The method was the same as that previously used with the following materials: 0.637 g (1.83 millimoles) of 3-heptafluoropropylhydroxymethylene-d-camphor of Example 2 was reacted with 0.199 g (0.61 millimole) of praseodymium (III) nitrate in the presence of 1.9 ml of 0.97 mole NaOH in 50 percent aqueous ethanol to yield 0.502 g of product corresponding to a yield of 71 percent.

EXAMPLE 8

The europium and praseodymium chelates of the diketones of Example 3 can be produced by substitution of the diketones of Examples 3 for the compounds (1) and (2) in Examples 4,5, 6, and 7 to produce the corresponding europium and praseodymium chelate.

It is desirable to effect removal of unreacted camphor in the preparation of the diketones of Examples 1 to 3 in order to avoid interference by the camphor, but purification of the corresponding chelates is not important if the camphor has been removed and the chelate reaction is carried out on the purified diketone.

In the utilization of the compounds of this invention, the preference for fluorine over chlorine in the described reagents stems from the fact that fluorine is more electronegative and therefore increases the tendency of the europium (III) and praseodymium (III) chelates to coordinate with substrates.

As previously pointed out, the compounds of this invention are able to distinguish between enantiomers (also known as enantiomorphs or optical antipodes). While NMR analysis has been used successfully to effect analysis for various groupings in the organic molecule, it has not been applicable in general for direct determine of enantiomeric compositions. The compounds of this invention operate as shift reagents in NMR analyses not only to shift the spectrum of the compound being analyzed but they are unique in their ability to shift enantiomers by different amounts and thus separate the resonances for enantiotopic protons in the d and l isomers. This enables direct determination of enantiomeric compositions of several classes of compounds from relative peak areas of shifted NRM spectra.

The diagram which has been used for camphor can more specifically be illustrated as follows:

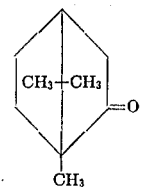

It will be understood that changes may be made in the details of formulation and operation without departing from the spirit of the invention, especially as defined in the following claims.

We claim:

1. The europium and praseodymium chelates having the general formula

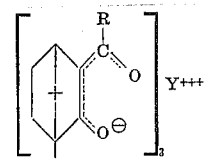

in which R is a halogenated alkyl group having from one to eight carbon atoms and in which at least some of the hydrogen groups are replaced with halogens selected from the group consisting of fluorine and chlorine and Y is the europium (III) or praseodymium (III) ion.

2. The chelates as claimed in claim 1 in which the R group has from one to five carbon atoms.

3. The compound tris[3-(trifluoromethylhydroxymethylene)-d-camphorato]europium (III).

4. The compound tris[3-heptafluoropropylhydroxymethylene)-d-camphorato]europium (III).

5. The compound tris[3-trifluoromethylhydroxymethylene-d-camphorato]praseodymium (III).

6. The compound tris[3-(heptafluoropropylhydroxymethylene)-d-camphorato]praseodymium (III).

* * * * *

Notice of Adverse Decision in Interference

In Interference No. 98,924, involving Patent No. 3,789,060, H. L. Goering, J. N. Eikenberry, and G. S. Koermer, FLUORINATED CAMPHOR DERIVATIVES AND EUROPIUM AND PRASEODYMIUM CHELATES THEREOF, final judgment adverse to the patentees was rendered Sept. 16, 1976, as to claims 1, 2, 3 and 5.

[*Official Gazette February 1, 1977.*]